United States Patent [19]

Hatano

[11] Patent Number: 4,550,346
[45] Date of Patent: Oct. 29, 1985

[54] MAGNETO-OPTIC INFORMATION RECORDING SYSTEM

[75] Inventor: Hideki Hatano, Tokorozawa, Japan

[73] Assignee: Pioneer Electronic Corporation, Tokyo, Japan

[21] Appl. No.: 484,998

[22] Filed: Apr. 14, 1983

[30] Foreign Application Priority Data

Apr. 15, 1982 [JP] Japan .................................. 57-062865

[51] Int. Cl.⁴ ...................... H04M 9/491; G11B 11/00
[52] U.S. Cl. ........................................ 358/330; 369/13
[58] Field of Search .............................. 358/330, 310; 369/13-15; 360/59, 114; 365/122; 350/375, 376

[56] References Cited

FOREIGN PATENT DOCUMENTS 56-61054   5/1981   Japan .
56-137538 10/1981   Japan .

OTHER PUBLICATIONS

"Application of Magneto-Optic Read-Out to a Video Signal", Tokumaru et al., NHK Lab. Notes, Feb. 1983, S.N. 285.
"Experimental Study on Magneto-Optical Disk Exerciser with the Laser Diode and Amorphous Magnetic Thin Films," by Imamura et al., Japanese Journal of Applied Physics, vol. 19, No. 12, pp. L731-L734, Dec. 1980.

Primary Examiner—Aristotelis M. Psitos
Attorney, Agent, or Firm—Fleit, Jacobson, Cohn & Price

[57] ABSTRACT

A magneto-optic information recording system for recording colorplexed composite video information on a magneto-optic information storage medium having a normal magnetization film, comprising means for emitting a recording laser beam to irradiate the normal magnetization film in the presence of a bias magnetic field; a field induction coil to induce the bias magnetic field; a low-pass filter for extracting a luminance signal component from the composite video information; a modulator to modulate the laser beam in accordance with the signal component extracted by the low-pass filter; a band-pass filter for extracting a carrier chrominance signal component from the composite video information; a frequency converter for converting the carrier chrominance signal component into a signal with a predetermined frequency lower than the frequency of the color subcarrier; and field control means responsive to the frequency-converted chrominance signal component and operative to vary the bias magnetic field in accordance with the frequency-converted chrominance signal component while the normal magnetization film is being irradiated with the modulated recording beam of light.

4 Claims, 2 Drawing Figures

MAGNETO-OPTIC INFORMATION RECORDING SYSTEM

FIELD OF THE INVENTION

The present invention relates in general to an information recording system and in particular to a magneto-optic information recording system. More particularly, the present invention relates to a magneto-optic information recording system using a magneto-optic information storage medium having normal magnetization characteristics. The present invention is further concerned with a combination of the information recording system and a magneto-optic information reproducing system for thermomagnetically reproducing the information recorded on such an information storage medium.

BACKGROUND OF THE INVENTION

An information recording and reproducing system has recently been proposed in which pieces of information are in a thermomagnetic fashion written in and read out from a magneto-optic information storage medium consisting of a film of an amorphous alloy of, for example, gadolinium iron (GdFe) or gadolinium cobalt (GdCo). A thin film of such an amorphous alloy is magnetizable in directions normal to the surfaces of the film and is operable as a normal magnetization film. When the normal magnetization film is heated to a temperature higher than the Curie point or the magnetic compensation temperature of the alloy with a weak bias field applied perpendicularly to the normal magnetization film, re-orientation of the spins of electrons takes place and as a consequence the direction of magnetization is inverted in the zone subjected to the bias field. If the film is preliminarily magnetized in one sense normal to the surfaces of the film and is then irradiated with a recording beam of laser at selected elementary spots of the film, the normal magnetization film is thus heated to such a temperature at the irradiated spots thereof with the result that the direction of magnetization at the particular spots is inverted in the presence of a weak bias field applied in the opposite sense to the surfaces of the film. If the original direction of magnetization is assumed to correspond to a logic "0" binary signal, then the inverted direction of magnetization will correspond to a logic "1" binary signal. Logic "0" and "1" binary signals can thus be recorded on a normal magnetization film preliminarily magnetized in a direction representative of either logic "0" or "1" binary signal when the film is irradiated with a laser beam at selected elementary spots thereof in the presence of a bias magnetic field.

The pieces of information which have in this fashion been stored on a magneto-optic information storage medium are read out from the storage medium through detection of the directions of magnetization at the individual elementary spots of the normal magnetization film by a method utilizing a magneto-optic phenomenon known as the magnetic Kerr effect. For this purpose, the normal magnetization film having the pieces of information stored thereon is irradiated with a recording beam of laser passed through a polarizer and the resultant linearly polarized laser beam is focused to the individual elementary spots of the normal magnetization film. The linearly polarized light thus incident on an elementary spot of the normal magnetization film is caused to have its plane of polarization turned through a certain angle in a direction which depends on the direction of magnetization at the particular spot. The laser beam reflected from the normal magnetization film is directed to an optic analyzer which transmits therethrough only the linearly polarized light reflected from an elementary spot magnetized in one direction. The linearly polarized light reflected from an elementary spot magnetized in the other direction is prohibited from being transmitted through the analyzer. The directions of magnetization at the individual elementary spots of the normal magnetization film can be in this manner detected from the beams of light emanating from the analyzer.

A magneto-optic information storage medium of the above described nature is operable for the recording of colorplexed composite video signals. For this purpose, frequency modulated versions of original composite video signals might be recorded on the magneto-optic medium. The frequencies of frequency modulated colorplexed composite video signals range up to an extremtly high level and, for this reason, an information storage medium to record such signals is required to have frequency characteristics higher than 5 megahertz. Such high frequency characteristics are not available with a magneto-optic information storage using the magnetic Kerr effect and, therefore, a magneto-optic information storage medium using a normal magnetization film is practically not operable for the recording of colorplexed composite video signals in a known magneto-optic information recording system.

It is, accordingly, an important object of the present invention to provide a magneto-optic information recording system which will make it possible to record colorplexed composite video signals on a magneto-optic information storage medium using a normal magnetization film without frequency modulating the original video signals.

It is another important object of the present invention to provide a combination of such an information recording system and a magneto-optic information reproducing system for thermomagnetically reproducing the information recorded on an information storage medium using a normal magnetization film.

SUMMARY OF THE INVENTION

In accordance with one important aspect of the present invention, there is provided a magneto-optic information recording system for recording colorplexed composite video information containing a luminance signal component with a predetermined frequency bandwidth and a color subcarrier carrying a chrominance signal component and having a predetermined frequency on a magneto-optic information storage medium having a normal magnetization film, comprising beam emitting means for emitting a beam of light to irradiate the normal magnetization film in the presence of a bias magnetic field; field induction means operative to induce the bias magnetic field; first signal extracting means for extracting the luminance signal component from the aforesaid composite video information; modulating means for modulating a recording beam of light in accordance with the luminance signal component extracted by the first signal extracting means; second signal extracting means for extracting the carrier chrominance signal component from the composite video information; frequency converting means for converting the carrier chrominance signal component into a signal with a predetermined frequency lower than the frequency of the aforesaid color subcarrier; and field control means which is responsive to the frequency-converted chrominance signal component produced by the frequency converting means and which is operative to vary the bias magnetic field in accordance with the frequency-converted chrominance signal component while the normal magnetization film is being irradiated with the modulated beam of light.

In accordance with another outstanding aspect of the present invention, there is provided a combination of a magneto-optic information recording system for recording colorplexed composite video information on a magneto-optic information storage medium having a normal magnetization film and a magneto-optic information reproducing system for reproducing the information recorded on the information storage medium, the colorplexed composite video information containing a luminance signal component with a predetermined frequency bandwidth and a color subcarrier carrying a carrier chrominance signal component and having a predetermined frequency, the information recording system comprising: beam emitting means for emitting therefrom a beam of light to irradiate the normal magnetization film in the presence of a bias magnetic field; field induction means operative to induce the bias magnetic field; first signal extracting means for extracting the luminance signal component from the aforesaid composite video information; modulating means for modulating a recording beam of light in accordance with the luminance signal component extracted by the first signal extracting means; second signal extracting means for extracting the carrier chrominance signal component from the composite video information; frequency converting means for converting the carrier chrominance signal component into a signal with a predetermined frequency lower than the frequency of the aforesaid color subcarrier; and field control means which is responsive to the frequency-converted chrominance signal component produced by the frequency converting means and which is operative to vary the bias magnetic field in accordance with the frequency-converted chrominance signal component while the normal magnetization film is being irradiated with the modulated beam of light; the information reproducing system comprising: beam emitting means for emitting therefrom a readout laser beam to irradiate the normal magnetization film for thermomagnetically picking up the information recorded on the film beam; signal detecting means for producing an electric signal representative of the information picked up from the normal magnetization film; first signal extracting means for extracting a frequency-modulated luminance signal component from the signal produced by the signal detecting means; second signal extracting means for extracting a frequency-converted carrier chrominance signal component from the signal produced by the signal detecting means; frequency demodulating means for frequency demodulating the frequency-modulated luminance signal component into a luminance signal having a frequency bandwidth; frequency converting means for converting the frequency-converted carrier chrominance signal component into a signal having a predetermined frequency; and signal mixing means operative to combine together the respective output signals from the frequency demodulating and frequency converting means of the reproducing system and producing a readout composite composite video information corresponding to the original colorplexed composite video information.

BRIEF DESCRIPTION OF THE DRAWINGS

The features and advantages of a method according to the present invention will be more clearly appreciated from the following description taken in conjunction with the accompanying drawing in which.

DETAILED DESCRIPTION OF THE INVENTION

Figure 1:
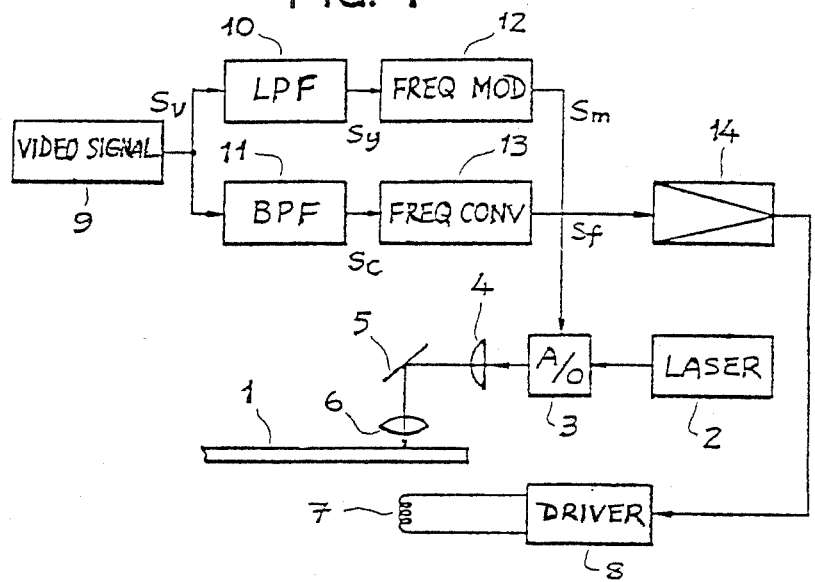
FIG. 1 is a schematic view showing, largely in the form of a block diagram, a preferred embodiment of a magneto-optic information recording system according to the present invention.

Referring to FIG. 1 of the drawing, a magneto-optic information storage disc partially shown at 1 consists of a circular substrate of a suitable dielectric substance such as glass or mica and a thin normal magnetization film of an alloy of, for example, gadolinium iron (GdFe) or gadolinium cobalt (GdCo) in an amorphous state. For the recording of information on the normal magnetization film of such an information storage disc 1, the storage disc 1 is placed on a turntable (not shown) driven for rotation about the center axis thereof and is irradiated with a laser beam originating in a suitable laser radiation unit 2 and having a predetermined wavelength. The laser beam emitted from the laser radiation unit 2 is passed through an acousto-optic (A/O) light modulator 3 and is modulated by a light modulation signal Sm supplied to the modulator 3. The laser beam thus modulated in phase and/or amplitude by the acousto-optic light modulator 3 is directed through a lens 4 to a mirror 5 which is positioned to have a reflective surface angled at 45 degrees with respect to the path of the light from the acousto-optic light modulator 3 and to the information storage disc 1. The laser beam reflected from the mirror 8 is focused by an objective lens 6 to the surface of the normal magnetization film of the rotating information storage disc 1. Adjacent the normal magnetization film of the information storage disc 1 is provided a field induction coil 7 for inducing a bias magnetic field in the vicinity of the elementary spots of the film to be irradiated with the recording laser beam. The field induction coil 7 is connected to a d.c. power source (not shown) across a coil driver circuit 8 having a control terminal. The coil driver circuit 8 is adapted to energize the coil 7 in accordance with a field control signal Sf supplied to the control terminal thereof. When the normal magnetization film of the information storage disc 1 is irradiated with the recording laser beam modulated with the signal Sm as described above and is thus heated to a temperature higher than the Curie point or the magnetic compensation temperature of the amorphous ferromagnetic alloy in the presence of the bias field thus induced by the field induction coil 7, the direction of magnetization is inverted at the spots irradiated with the beam. The normal magnetization film being preliminarily magnetized in one sense normal to the surfaces of the film and representative of, for example, a logic "0" binary signal, the direction of magnetization at the heated spots of the film is inverted to correspond to a logic "1" binary signal. Logic "0" and "1"

binary signals can thus be recorded on the normal magnetization film of the information storage disc 1 when the film is irradiated with the recording laser beam at selected elementary spots thereof in the presence of the bias magnetic field induced by the field induction coil 7 in accordance with the field control signal Sf supplied to the coil driver circuit 8.

The light modulation signal Sm to be supplied to the acousto-optic light modulator 3 and the field control signal Sf to be supplied to the coil driver circuit 8 as described above are produced on the basis of a colorplexed composite video signal Sv supplied from a suitable source 9. The colorplexed composite video signal Sv to be supplied from the source 9 is, for example, an NTSC color television video signal containing a luminance signal component with a frequency bandwidth ranging from 0 to about 3 megahertz and a carrier chrominance signal component entrained on a color subcarrier having a frequency of about 3.58 megahertz. The composite video signal Sv thus supplied from the source 9 is fed to a parallel combination of first and second signal extracting means which are respectively constituted by a low-pass filter (LPF) 10 and a band-pass filter (BPF) 11 in the embodiment herein shown. The low-pass filter 10 has a pass band spanning from, for example, 0 to about 3 megahertz and is adapted to pass therethrough the luminence signal component Sy of the supplied composite video signal Sv. The band-pass filter 11 has a pass band corresponding to the color subcarrier frequency of, for example, about 3.58 megahertz and is thus adapted to pass therethrough the carrier chrominance signal component Sc. The luminance signal component Sy passed through the low-pass filter 10 is fed to a frequency modulator 12 and is thereby frequency modulated into a signal having a predetermined amplitude with a maximum carrier level (or sync tip level) at a predetermined frequency of, for example, 3.1 megahertz and a white level at a predetermined frequency of, for example, 4.5 megahertz. The signal thus produced by the frequency modulator 12 is supplied as the above mentioned light modulation signal Sm to the control terminal of a suitable driver circuit (not shown) for the acousto-optic light modulator 3. The laser beam emitted from the laser radiation unit 2 is in this manner modulated in phase or amplitude in the acousto-optic light modulator 3 in accordance with the frequency-modulated luminance signal component of the original composite video signal Sv. On the other hand, the carrier chrominance signal component Sc passed through the band-pass filter 11 is fed to a frequency converter 13 and is thereby converted to have a reduced frequency band of, for example, 767 kilohertz. The output signal from the frequency converter 13 is amplified by an amplifier 14 and the resultant signal is fed as the previously mentioned field control signal Sf to the control terminal of the coil driver circuit 8 for the field induction coil 7. The current to be supplied to the field induction coil 7 and accordingly the bias magnetic field to be induced by the coil 7 are thus controlled to vary with field control signal Sf supplied to the coil driver circuit 8 and accordingly with the pieces of information contained in the carrier chrominance signal component Sc extracted from the original NTSC colorplexed composite video signal Sv. The pieces of information contained in the light modulation signal Sm with which the laser beam incident on the normal magnetization film of the information storage disc 1 is modulated are in this fashion modulated with the carrier chrominance signal component Sc of the original composite video signal. In other words, the frequency-modulated, fixed-amplitude signal Sm produced from the luminance signal component Sy of the original composite video signal Sv is modulated in amplitude in accordance with the pieces of information contained in the carrier chrominance signal component Sc of the composite video signal Sv. The original colorplexed composite video signal Sv supplied from the source 9 is thus recorded on the information storage disc 1 in the forms of the frequency-modulated, fixed-amplitude luminance signal component and the frequency-converted carrier chrominance signal component.

Figure 2:
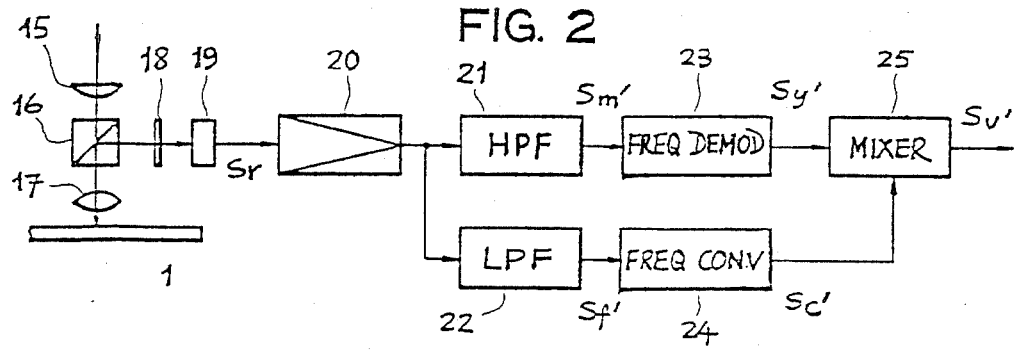
FIG. 2 is a schematic view showing, also largely in the form of a block diagram, an information reproducing system adapted to read out the information recorded on a magneto-optic information storage medium in the information recording system shown in FIG. 1.

FIG. 2 of the drawings shows an example of a magneto-optic information reproducing system to read out the pieces of information recorded on the information storage disc 1 as above described. Though not shown in the drawing, the magneto-optic information reproducing system comprises a laser radiation unit adapted to emit therefrom a readout laser beam differing in wavelength from the laser beam used for the recording of information. The readout laser beam is passed through a lens 15 into a beam splitter prism 16 which has a junction plane inclined at the angles of 45 degrees to the path of the beam transmitted through the lens 15. Thus, the laser beam emanating from the lens 15 enters the beam splitter prism 16 at the angles of 45 degrees to the inclined junction plane of the prism 16 and is focused to the normal magnetization film of the information storage disc 1 through an objective lens 17. The readout laser beam incident on the normal magnetization film of the information storage disc 1 thermomagnetically reads the pieces of information recorded on the film and is reflected from the film as a beam containing radio-frequency signals representative of the pieces of information picked up from the normal magnetization film. The beam of light carrying the pieces of information read out from the information storage disc 1 in this fashion is passed backwardly through the objective lens 17 and is redirected through the beam splitter prism 16 toward an optic analyzer 18. The beam of light entering the beam splitter prism 16 backwardly is reflected from the inclined junction plane of the prism 16 at the angles of 45 degrees to the path of the light from the information storage disc 1 and is thereby separated from the beam entering the prism 16 from the lens 15. The optic analyzer 18 is adapted to pass therethrough only the linearly polarized light reflected from those elementary spots of the normal magnetization film which are magnetized in a predetermined direction and to reflect the linearly polarized light reflected from the elementary spots magnetized in the opposite direction. The beam of light passed through the analyzer 18 has thus carried thereon the logic "0" or "1" binary signals recorded on the film at the elementary spots magnetized in a predetermined direction. The beam of light emanating from the analyzer 18 is directed to a photoelectric transducer 19 such as a photodiode whereby the detected pieces of information carried by the beam of light incident on the photoelectric transducer 19 are converted into a corresponding radio-frequency signal Sr. The radio-frequency signal Sr thus produced by the photoelectric transducer 19 is supplied through a readout amplifier 20 to a parallel combination of first and second signal extracting means which are constituted by a high-pass filter (HPF) 21 and a low-pass filter (LPF) 22, respectively. The high-pass filter 21 has a pass band spanning between predetermined frequencies of and is adapted to extract a frequency-modulated, fixed-amplitude luminance signal component Sm' from the supplied radio-frequency signal Sr. The low-pass filter 22 has a pass band of a predetermined frequency and is adapted to extract a frequency-converted carrier chrominance signal component Sf' from the supplied radio-frequency signal Sr. The luminance signal component Sm' passed through the high-pass filter 21 is demodulated in frequency by a frequency demodulator 23 into a luminance signal Sy' having a frequency band ranging between 0 megahertz and 3 megahertz, while the chrominance signal component Sf' passed through the low-pass filter 22 is converted in frequency into a signal Sc' having a predetermined frequency of, for example, about 3.58 megahertz. The signals Sy' and Sc' thus delivered from the frequency demodulator 23 and the frequency converter 24, respectively, are fed to a mixer 25 and are thereby combined together to produce a readout composite video signal Sv' corresponding to the original colorplexed composite video signal Sv supplied from the source 9 (FIG. 1).

What is claimed is:

1. A magneto-optic information recording system for recording colorplexed composite video information containing a luminance signal component with a predetermined frequency bandwidth and a color subcarrier carrying a chrominance signal component and having a predetermined frequency on a magneto-optic information storage medium having a normal magnetization film, comprising
   beam emitting means for emitting therefrom a recording beam of light to irradiate said normal magnetization film in the presence of a bias magnetic field;
   field induction means operative to induce said bias magnetic field;
   first signal extracting means for extracting said luminance signal component from said composite video information;
   modulating means for modulating said recording beam of light in accordance with the luminance signal component extracted by said first signal extracting means;
   second signal extracting means for extracting the chrominance signal component from said composite video information;
   frequency converting means for converting the chrominance signal component into a signal with a predetermined frequency lower than the frequency of said color subcarrier; and
   field control means which is responsive to the frequency-converted chrominance signal component produced by said frequency converting means and which is operative to vary said bias magnetic field in accordance with the frequency-converted chrominance signal component while the normal magnetization film is being irradiated with said modulated beam of light.

2. A magneto-optic information recording system as set forth in claim 1, in which said modulating means comprises a frequency modulator for frequency modulating said luminance signal component and producing a modulated luminance signal having a frequency bandwidth higher than the frequency bandwidth of the luminance signal component extracted from said composite video information, and a light modulator responsive to said modulated luminance signal and operative to modulate the beam of light to be incident on said normal magnetization film in accordance with the modulated luminance signal.

3. A combination as set forth in claim 1, in which said modulating means of said recording system comprises a frequency modulator for frequency modulating said luminance signal component and producing a modulated luminance signal having a frequency bandwidth higher than the frequency bandwidth of the luminance signal component extracted from said composite video information, and a light modulator responsive to said modulated luminance signal and operative to modulate the beam of light to be incident on said normal magnetization film in accordance with the modulated luminance signal.

4. A combination of a magneto-optic information recording system for recording colorplexed composite video information on a magneto-optic information storage medium having a normal magnetization film and a magneto-optic information reproducing system for reproducing the information recorded on the information storage medium, the composite video information containing a luminance signal component with a predetermined frequency bandwidth and a color subcarrier carrying a chrominance signal component and having a predetermined frequency,
   said information recording system comprising:
   beam emitting means for emitting therefrom a beam of light to irradiate said normal magnetization film in the presence of a bias magnetic field;
   field induction means operative to induce said bias magnetic field;
   first signal extracting means for extracting said luminance signal component from said composite video information;
   modulating means for modulating a recording beam of light in accordance with the luminance signal component extracted by said first signal extracting means;
   second signal extracting means for extracting said chrominance signal component from said composite video information;
   frequency converting means for converting the chrominance signal component into a signal with a predetermined frequency lower than the frequency of said color subcarrier; and
   field control means which is responsive to the frequency-converted chrominance signal component produced by said frequency converting means and which is operative to vary said bias magnetic field in accordance with the frequency-converted chrominance signal component while the normal magnetization film is being irradiated with said modulated beam of light;
   said information reproducing system comprising:
   beam emitting means for emitting a readout laser beam to irradiate said normal magnetization film for thermomagnetically picking up the information recorded on the film;
   signal detecting means for producing an electric signal representative of the information picked up from the normal magnetization film;
   first signal extracting means for extracting a frequency-modulated luminance signal component from the signal produced by the signal detecting means;
   second signal extracting means for extracting a frequency-converted carrier chrominance signal component from the signal produced by the signal detecting means;

frequency demodulating means for frequency demodulating said frequency-modulated luminance signal component into a luminance signal having a frequency bandwidth;

frequency converting means for converting said frequency-converted carrier chrominance signal component into a signal having a predetermined frequency; and signal mixing means operative to combine together the respective output signals from said frequency demodulating means and said frequency converting means of the reproducing system and producing a readout composite composite video information corresponding to the original colorplexed composite video information.

* * * * *